United States Patent
Elley et al.

Patent Number: 5,949,450
Date of Patent: *Sep. 7, 1999

[54] PRINT MODE AND SYSTEM TO ALLEVIATE WAIT-BANDING

[75] Inventors: Rose Marie Elley; Joseph Henry Bauman, both of Brush Prairie, Wash.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/616,539

[22] Filed: Mar. 15, 1996

[51] Int. Cl.⁶ .............................. B41J 2/145; G06K 15/00
[52] U.S. Cl. ................................. 347/40; 347/5; 395/108
[58] Field of Search .................... 347/5, 37, 40, 347/41, 102; 395/108

[56] References Cited

U.S. PATENT DOCUMENTS

| | | | |
|---|---|---|---|
| 4,855,752 | 8/1989 | Bergstedt | 346/1.1 |
| 5,043,748 | 8/1991 | Katayama et al. | 346/140 R |
| 5,198,833 | 3/1993 | Kubota | 346/1.1 |
| 5,216,754 | 6/1993 | Sathi et al. | 395/113 |
| 5,359,355 | 10/1994 | Nagoshi et al. | 347/9 |
| 5,477,246 | 12/1995 | Hirabayashi et al. | 347/12 |
| 5,489,926 | 2/1996 | Arbeiter | 347/16 |
| 5,583,547 | 12/1996 | Gast et al. | 347/22 |
| 5,604,597 | 2/1997 | Imai | 347/40 |
| 5,608,439 | 3/1997 | Arbeiter et al. | 347/102 |
| 5,627,947 | 5/1997 | Chan et al. | 395/105 |
| 5,644,683 | 7/1997 | Ross et al. | 395/108 |

FOREIGN PATENT DOCUMENTS

0516420A2  12/1992  European Pat. Off. .......... B41J 2/205

Primary Examiner—Stuart N. Hecker
Attorney, Agent, or Firm—H. Brian Davis

[57] ABSTRACT

An improved print mode and system for alleviating wait-banding is disclosed. In the disclosed print mode, the delay between print scans may be increased or decreased at the full swath boundaries. Within a full swath, the delay between passes is set at a standard default delay. At the full swath boundary, if a low-memory condition is sensed or if there is a need to perform a service routine, the delay is ramped up. If there is currently not a low-memory condition or if there is not a need for a pen service, the delay is ramped down. This print mode provides that the print passes are more uniformly distributed in time, thus alleviating wait-banding. This print mode is particularly advantageous for glossy medium and transparencies.

17 Claims, 4 Drawing Sheets

1 PASS

2 PASS

4 PASS

PRINT MODE AND SYSTEM TO ALLEVIATE WAIT-BANDING

BACKGROUND OF THE INVENTION

1. Field of the Invention

The present invention relates to scanning ink-jet printers, and particularly to a print method and system providing improved print quality.

2. Statement of the Relevant Art

Ink jet printers commonly use a scanning printhead to deposit a pattern or matrix of dots as the printhead is scanned across a print medium (page). After the printhead is scanned across the page, the page is incrementally advanced in a direction orthogonal to the scanning axis to position the medium for a subsequent scan. Since the dots are small and closely spaced, the pattern is perceived by the human eye as if the dots formed a continuous image. Dots of the three subtractive primary colors, cyan, magenta (CMY), and yellow, may be combined to create the visual perception of a wide range of colors. The printed image is composed of a contiguous series of horizontal swaths, which taken together, create the overall image. Each swath is the height of the array of nozzles on the printhead. More than one scan of the printhead may be made for each swath, and the scans can be interleaved between swaths to smooth out boundaries between swaths. This process is referred to as "shingling" because it is reminiscent of the way shingles are laid down on a roof.

The printer is usually connected to a host computing device, such as a personal computer. The host typically has an a video monitor to allow the user to interface with the device. When a user is working with an image in the host, this image is usually stored in terms of a graphical computer language, which is independent of any particular printer or monitor resolution, and is usually stored in terms of additive red, green, blue (RGB) primary colors. The image thus stored must be converted to a format usable by the printer, i.e., at the resolution of the printer and in CMY format. This conversion is typically done by means of a "driver," which typically is a software package installed in the host to work with the user's computer application. The driver typically compresses the information and sends it to the printer controller in terms of escape sequences in one of various graphics languages, such as Hewlett-Packard Company's Printer Control Language (PCL™) that describe the image and where it is placed on the page. Each sequence describes only a single dot row on the page. The driver can send these sequences in packets of various sizes, as little as a single dot row, or hundreds of dot rows at a time.

Once the printer controller receives the PCL sequences it composes them into page sectors of information that represents exactly which dots and of which color go on the page. These page sectors are a full page wide and may be only a few scans worth of information, or may be several vertical inches of the image. The page sectors do not necessarily correspond to the size of packets of PCL sequences the driver has sent the controller. After the controller composes these page sectors, the controller converts the sectors into passes for the printhead. In other words, once a page sector has been composed, the controller must then determine exactly how it will cause the printhead to make its scans back and forth across the page to deposit the dots according to the image sector information. In many cases, a multi-pass per swath print mode is used. If the image involves color, the printer must prepare pass information for each of the colors used.

The printer can typically begin printing the passes very quickly after the page sector information is ready. However, the page sector information may be delayed because of various factors. For example, the complexity of the image may cause delays in the driver. Additional delays may be encountered in the controller during composition of the page sectors. Also the input/output interfaces at both the host and/or the printer can cause delays. After all of the passes have been printed for which page sector information is ready, no additional passes can be printed until new page sector information is available. If no page sector information is ready in the controller, the printhead must remain idle until there is enough information for another pass.

Another cause of delays is "servicing" that must be performed on the printhead to keep it printing with optimal print quality. These servicing steps include routines known as "spitting" and "wiping." In spitting, the nozzles are activated at high energy to clear out vicious material or other debris generated from printing. In "wiping " a polymeric blade is passed across the orifice plate to scrape away excess ink and debris. The servicing routines are typically performed at a "service station" located at one side of the print zone. Servicing routines are preferably performed between pages, for example while the next page is loading. However, if the page has a high print density, servicing may need to be performed mid page. Servicing routines can take up to about 10 seconds to perform, which is a significant delay compared to other delays during the printing of a page.

When multi-pass shingled printing is used, a problem called "wait-banding" can result from any of these delays. When a series of primary color passes are made to print a particular secondary color, the actual color resulting on the page can vary depending on the time delay between when the first pass is made and the second pass is made. This difference is due in large part to the ink drops of the first pass drying in different degrees before the drops of the second pass are deposited. For example, assume a large area of blue is to be printed. Assume that in one scan a cyan pass is made and then time T1 goes before a magenta pass is made over the cyan. A given hue of blue will result. On a contiguous swath, a cyan pass is made, but then a different time T2 goes by before the magenta pass is made. In this case, a slightly different hue of blue will result. The two contiguous swaths of different blue colors will be perceived as undesirable wait-banding. Wait-banding is particularly a problem in darker colors, such as darker blues.

One approach to deal with this problem would be to establish a fixed delay between each print pass, with the hope that by the time the passes are complete, the printer will have more page sector information available for printing. This approach, however, would disadvantageously increase the overall time needed to print any given page, even though page sector information is ready in advance of when the passes are made. In other words, the printer throughput of the printer would be unnecessarily decreased. Throughput is an important issue in the highly competitive ink-jet printer market.

There remains a need for a printing method and system that minimizes wait-banding without also unnecessarily decreasing the throughput of the printer.

SUMMARY OF THE INVENTION

The present invention provides a method of printing with an ink-jet printing system including a scanning ink-jet printhead and a media-advance mechanism. This method comprises the following steps:

(a) providing image data representative of an image;

(b) composing the image data into swath data, further composed of a series of scans;

(d) providing a standard delay;

(e) providing a variable delay;

(f) if the next scan is at a full swath boundary, then
   (1) if a low on swath data condition is found, then increasing the variable delay,
   (2) if a low on swath data condition is not found, and if the delay is greater than the standard delay, then decreasing the variable delay, and
   (3) printing the next scan after the variable delay; and (g) repeating step (f) until the image is printed.

In one preferred embodiment, step (f) above may further provide that if the next scan is not at a full swath boundary, then the next scan is printed at the standard delay. The invention also provides a printing system programmed to perform the above steps.

A printing method and system are thus provided that minimize wait-banding problems. The advantages of this method and system are particularly noticeable on glossy paper and transparencies.

DETAILED DESCRIPTION OF THE ILLUSTRATED EMBODIMENT

Figure 1:
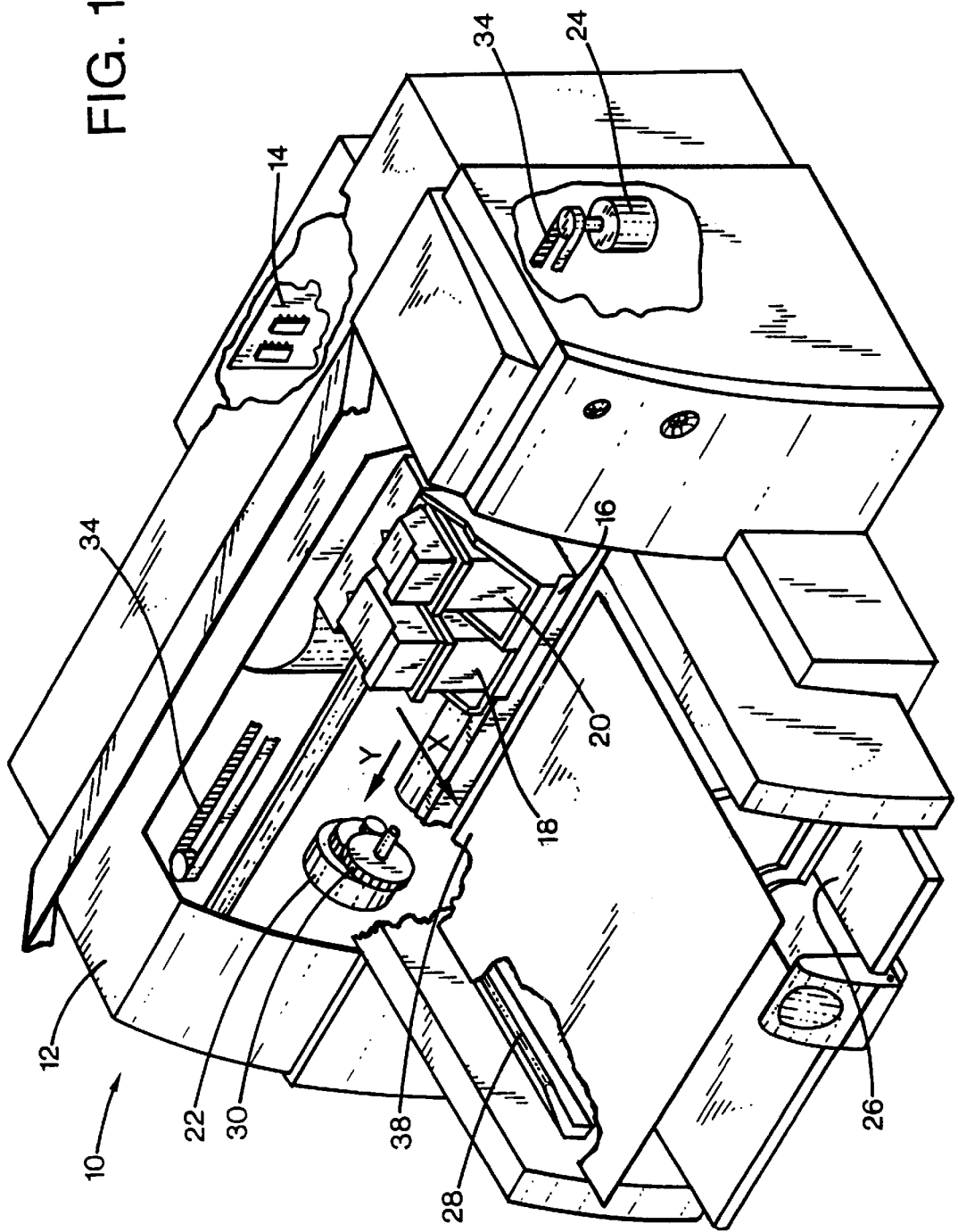
FIG. 1 is a perspective, partial cut-away, view of a printer of the invention.

FIG. 1 illustrates an ink-jet printer, generally indicated at 10, of the invention. Printer 10 includes a housing 12 in which are mounted a controller 14, a print cartridge carriage 16 (which receives print cartridges 18 and 20), medium advance motor 22, and carriage drive motor 24. Also attached to housing 12 are a paper input tray 26, wings 28, and paper output tray 30. Controller 14 is communicatively connected to a host printing device (not shown), such as a personal computer, from which it receives data signals representative of the image and/or text desired to be printed. Controller 14 is also communicatively connected with printheads 18 and 20, medium-advance motor 22, and carriage advance motor 24. Medium-advance motor 22 is linked via a gearing assembly 32 to polymeric rollers (not shown) that drive the print medium through the printer. Medium-advance motor 22 is also engaged via a clutch and gearing assembly (not shown) to wings 28 to selectively (based on input from controller 14) open or close wings 28. Carriage advance motor 24 is linked via a drive belt 34 to carriage 16. A stack of paper is placed in the input tray 26. Sheet of paper 38 is shown being printed on.

At the appropriate time, controller 14 actuates carriage advance motor 24 to drive carriage 26 in the carriage advance axis Y to scan printheads 18 and 20 over the current swath on sheet 38. As print cartridges 18 and 20 containing printheads (not shown) are scanned in the Y direction, the printheads are addressed by controller 14 to expel droplets of ink in the desired dot matrix pattern across sheet 38. After a scan is complete, controller 14 sends a signal to medium-advance motor 22 to drive sheet 38 incrementally in the medium-advance direction X shown so that the printheads can begin another pass. Multiple adjacent horizontal passes are printed in this manner to complete the printing of the desired image on the page. More than one pass can also be made over the same section without advancing the paper. As page 38 is printed it rests on wings 28. After page 38 is completed, and when the previous page (resting in output tray 30) is dry and/or when a new page is ready to print, wings 28 open up and allow page 38 to drop vertically down onto the output tray. Since the previous page is typically relatively dry, and since page 38 drops vertically down onto this previous page, it is intended that no smearing of the ink will occur on the previous page.

Figure 2:
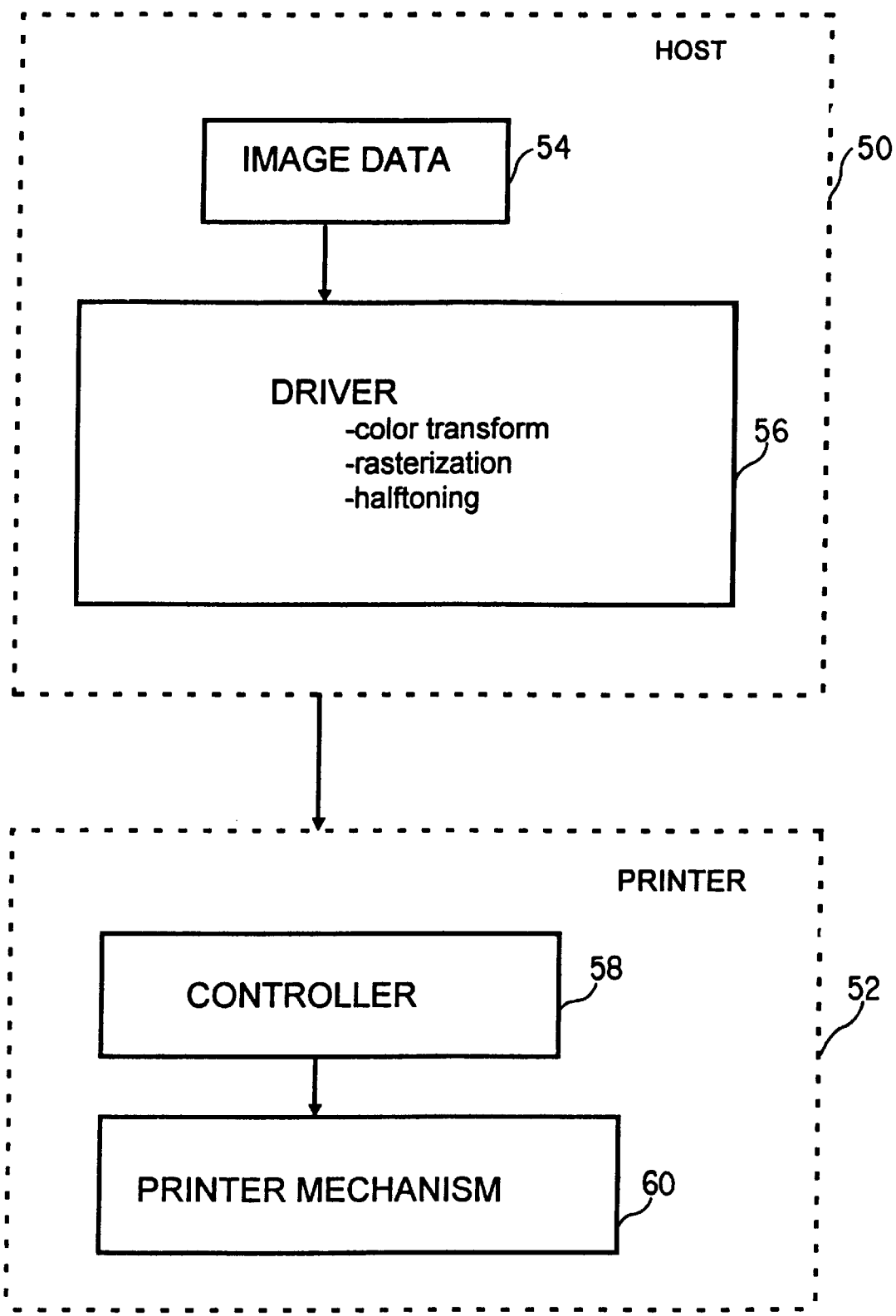
FIG. 2 is a block schematic diagram of a printing system of the invention.

FIG. 2 schematically illustrates a printing system of the invention. This printing system includes a host 50 and a printer 52. Host 50 contains image data 54 and driver 56. Printer 52 includes controller 58 and printer mechanism 60. Host 50 is typically a computing device such as a personal computer and typically includes an input mechanism such as a keyboard and/or mouse and a video output such as a computer monitor. Image data 54 may include text and/or graphics created by a user and/or images derived from some other source, such as a scanner, photo CD camera, or video recorder. This image data may be stored in any of various formats or computer graphics languages, which may be independent of the resolution of any particular computer monitor or printing device. Image data 54 is typically held in the host as red, green, blue (RGB) additive color format at 256 levels of intensity for each color.

Driver 56 performs several important functions to the image data, these being mainly color transformation, rasterization, and halftoning. During color transformation, the image data 54 is converted to subtractive cyan, magenta, and yellow (CMY) color planes. During rasterization, the image data is converted over to a rasterized format consistent with the resolution of the printer involved. For example, if the resolution is 300 DPI, the image received from the host 50 is rasterized to 300 DPI. During the halftoning step, the essentially analog per pixel (256 levels per pixel) must be converted to only binary information for each pixel: a dot on or a dot off. The information must be halftoned because ink-jet printers are essentially binary in nature. In other words, they can only print two levels for each color: on or off. Halftoning is described in *Digital Halftoning,* Robert Ulichney, MIT Press, 1987. The driver then converts this rasterized binary pixel information into escape sequences to be communicated to the printer. These sequences communicate one dot row of information at a time. These dot row sequences are communicated in series to the printer controller 58.

The controller determines which dots will be printed in which pass or scan of the printhead. It is common in ink-jet printers for a given swath of printing to be composed of more than one pass. Also, to smooth out boundaries between swaths, the passes are often interleaved between swaths. An example of interleaved multi-pass printing is disclosed in U.S. Pat. No. 4,967,203 (Doan et al.), assigned to the present assignee. The controller also determines when wings 28 will open and when motor 22 will engage to drive a new page through the printer. The governor uses the timer to perform this function.

The driver 56 is typically software installed into the memory of the host. The controller 58 is typically implemented in firmware on a controller card in the printer. However, this separation between host, driver and controller may be altered. For example, both the driver and controller may be implemented in software held in the host memory. In this case, the printer would simply act upon very explicit scan-by-scan pixel instructions received from the host, since the functions of rasterization, color transform, halftoning and page sector management would all be performed at the host level. This implementation is referred to as a "dumb printer." On the other extreme, both the driver and the controller may be implemented as firmware and/or software in the printer, with all functions of rasterization, color transform, halftoning and page sector management being handled at the printer. In this embodiment, the host supplies the image data at a very high level (typically in a resolution-independent graphics language) to the printer. This implementation is referred to as a "smart printer."

Among other things, the controller 58 performs the step commonly referred to as the print mode, in which the actual scans or passes of the printhead are determined. Thus the controller 58 implements the particular patterns of dots laid down in each pass. For example, if a two-pass, shingled print mode is used, then the controller prepares instructions to have the printhead lay down dots in whatever pattern is chosen for the each of the two passes. If a four pass print mode is chosen, the controller 58 prepares instructions for each of the four passes. The controller 58 controls the printer mechanism 60 (including the paper advance motor, carriage-scan motor, printhead firing resistors, etc.) to lay the physical dots down on the paper.

The following Table 1 illustrates an interleaved four-pass print mode. In this table, the numbers represent the print pass, and the letters represent the four different complementary print patterns. The first pattern is labeled "A," the second pattern is labeled "B," the third labeled "C," and the fourth labeled "D." In a first pass of the printhead, a pattern of dots is printed, leaving certain dot positions empty. The print medium is then advanced (for example one-fourth of the effective printhead height) to place a new group of nozzles in position to complete a pass. A second pass is then made with the entire printhead to deposit a second pattern of dots, thus filling in a portion of the interstitial positions in the first swath and also printing the second pattern over a portion of a second swath. This process is repeated for the third and fourth passes. Then the paper is again advanced one-fourth of the effective nozzle array height again and the process is repeated. In this way, successive print medium advances and alternating first, second, third, and fourth patterns are printed with the entire printhead to complete a series of contiguous swaths with the four print mode patterns being thus interleaved between print swaths.

TABLE 1

| Print Passes | 1 | 2 | 3 | 4 | 5 | 6 | 7 | 8 | 9 | 10 | 11 | 12 |
|---|---|---|---|---|---|---|---|---|---|---|---|---|
| Swath 1 | A | B | C | D |  |  |  |  |  |  |  |  |
| Swath 2 |  | B | C | D | A |  |  |  |  |  |  |  |
|  |  |  | C | D | A | B |  |  |  |  |  |  |
|  |  |  |  | D | A | B | C |  |  |  |  |  |
|  |  |  |  |  | A | B | C | D |  |  |  |  |
| Swath 3 |  |  |  |  |  | B | C | D | A |  |  |  |
|  |  |  |  |  |  |  | C | D | A | B |  |  |
|  |  |  |  |  |  |  |  | D | A | B | C |  |
|  |  |  |  |  |  |  |  |  | A | B | C | D |

As can be seen in Table 1, the four patterns A, B, C, and D are interleaved between the successive print passes. This interleaving or shingling helps conceal any white-banding or dark-banding that might occur due to errors in the medium advance mechanism. The first print swath is of necessity only a partial swath to begin the printing process at the top of a page or section of an image. As shown, once the steady state is achieved in the second swath, it takes four passes of the printhead to complete each full swath.

Delays can occur because of various factors. For example, the driver 56 can send data to the printer at various rates depending on the computational complexity of the data. This rate is not always constant because the complexity can very widely for any given page. The result is that less data than can be currently printed arrives at the controller 58. This may be referred to as a low-memory condition, because the amount of information in memory available to the controller 58 is less than can optimally be used to print at full speed.

Delays can also occur because of servicing routines. It is preferred that servicing routines be performed between pages, for example, after a page has finished printing while a new page is being loaded from the supply tray. However, if the page has high print density, a servicing routine may need to be performed during the printing of a page. These servicing delays can take as much as 10 seconds, which is a significant delay compared to other delays that may be experienced, and can result in significant wait-banding.

If no attempt is made to average or smooth out the differences in the normal time between print passes when no delays occur and when delays occur from low-on-memory conditions or servicing routines, color passes will have varying times to dry between overlaid print passes. These time differences will result in slight color differences between the areas where overlapping passes are laid down on ink that has different amounts of time to dry. These differences of ink color will be perceived by the observer as horizontal bands of color of varying hues. This problem of color changes is referred to as "wait-banding." It is particularly a problem with dark secondary colors (using CMY primaries) such as dark blue.

A simple technique for dealing with the wait-banding problem is to establish a short fixed time delay between each of the four print passes. This standard delay allows more time for the controller to receive data from the driver. However, since this standard delay may not always be enough to provide for all low-on-data conditions, and would not provide sufficient time for a servicing routine, there will be a color shift between the areas where there is a greater time delay between passes. If the time delay for each low-on-data condition were the same, it would be possible to provide the correct fixed time delay to provide maximum throughput and minimum wait-banding. Of course, a long delay could always be provided after each scan, but this would result in unacceptable reduction in printer throughput.

Figure 3:
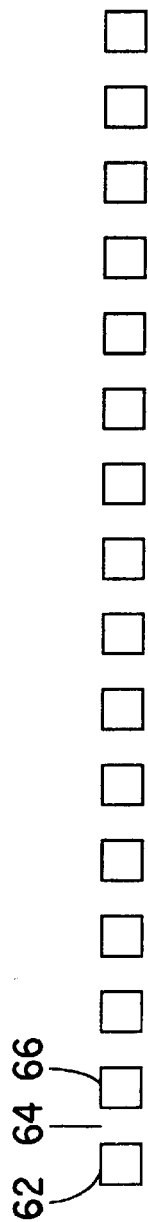
FIG. 3 is a schematic representation of a print mode with no delays provided.

FIG. 3 illustrates a simple one-pass print mode that has a standard fixed delay between each pass. After the first pass 62, a standard delay 64 is provided before the next pass 66 is made. This same routine of a single pass and a single standard delay is followed for the entire image. A problem with this print mode is that it does not adjust for low-on-memory conditions or the need for a service routine. If the printer gets low on data received from the driver or if a service needs to be done, a longer delay will of necessity be imposed between the passes involved, wait-banding can be a problem.

Figure 4:
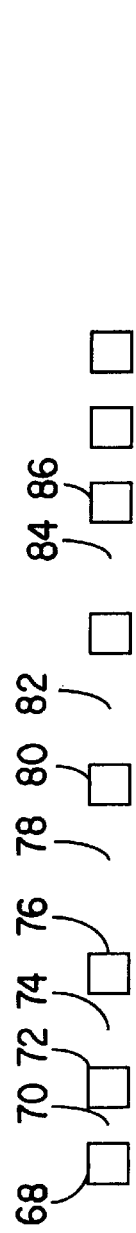
FIGS. 4–6 are schematic representations of print modes according to the present invention.
Figure 5:
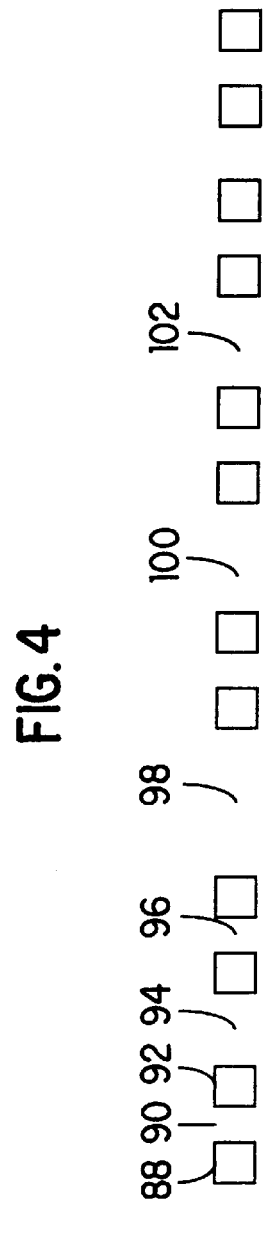
Figure 6:
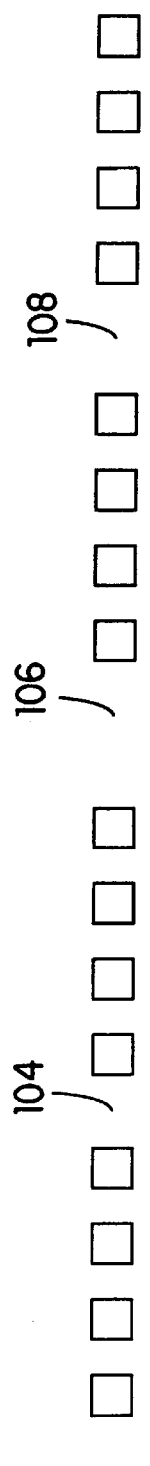
Figure 7:
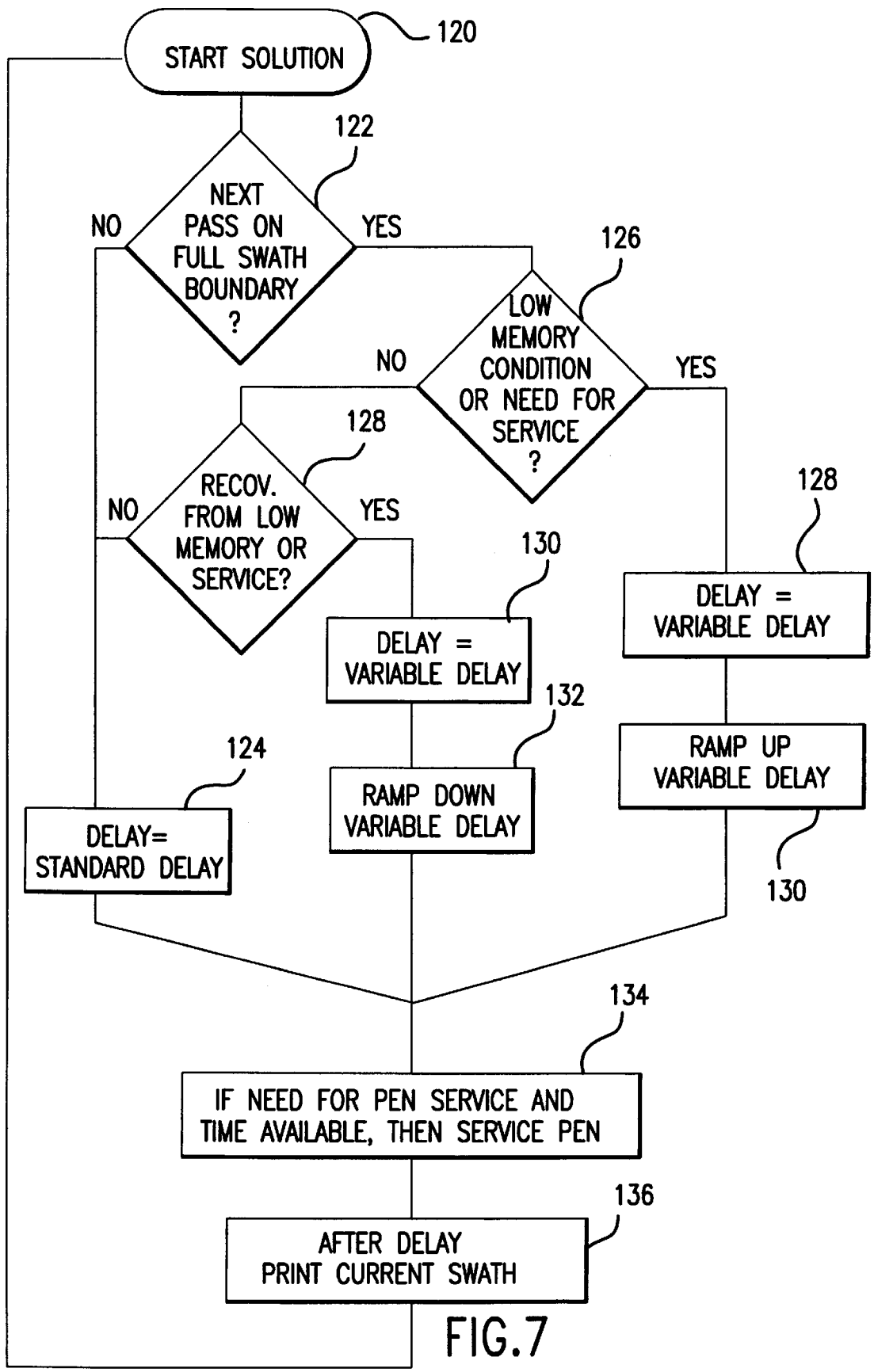
FIG. 7 is a flow chart of a print method of the invention.

FIGS. 4–6 illustrates print modes according to the present invention in which an algorithm is used to smooth out the time delays between passes when delays occur due to low-on-data conditions or servicing routines. These print modes therefore provides the beneficial result that there will be less wait-banding.

In FIG. 4, a one-pass print mode is shown. After the first pass 68, a standard delay, for example 0.5 seconds, is provided before pass 72 is made. After pass 72, the print method recognizes a low-on-data condition and ramps up the delay, so that a longer delay 74 is provided before pass 76 is made. After pass 76, the algorithm still detects a low-on-data condition and again ramps up the delay to a longer delay 78 before pass 80 is made. After pass 80, the print mode recognizes that a low-on-data condition no longer exists and ramps the next delay 82 down. Similarly, delay 84 is also ramped down before pass 86 is made. Thus the delays are smoothed out in time to reduce wait-banding without unduly reducing throughput.

In FIG. 5, a two-pass print mode is illustrated. After the first pass 88 is a standard delay 90 before pass 92 is made. After pass 92, the method recognizes a low-on-data condition, and provides a variable delay by ramping up from the standard delay to delay 92. Again between the next two passes, a standard delay 96 is used, but after these passes, a low-on-data condition is still detected, so that the method again ramps up the variable delay to a longer delay 98. After the next two passes, the method no longer detects a low-on-data condition, and ramps down the variable delay to delay 100. Delay 102 is similarly a variable delay ramped down from delay 100. Within each two-pass group, a standard delay is provided, as shown.

FIG. 6 illustrates a four-pass print mode. After the first four passes, the method recognizes a low-on-data condition and ramps up the variable delay to delay 104. Similarly after the next four passes, the method still detects a low-on-data condition and ramps up the variable delay to delay 106. After the next four passes, the variable delay is ramped down to delay 108. As with the two-pass mode of FIG. 5, the delays between the passes in the four-pass groups are the standard delay.

FIG. 6 is a flow chart of a print mode according to the present invention. In this print mode a standard delay is provided as the default. This delay may be for example 0.5 seconds. When certain events occur, the delay may be changed to a variable delay that can be ramped up or down. When the delay is ramped up, it is done exponentially according to the following formula:. This results in the delay doubling each time it is ramped up. When the delay is ramped down, it is done linearly. This results in rapidly increasing ramp up, for example, in the event of a low memory condition or a need for a pen service. However, the delay is slowly ramped down, so that, for example, if another low memory condition were to occur, the delay will not need to recover from a smaller delay.

In this illustrated embodiment, when the variable delay is ramped up the following formula is used to ramp up the previous variable delay $t_{n+1}=2\ t_n$, (with $t_{max}=16$ seconds) and when the delay is ramped down the variable delay uses the formula $t_{n+1}=0.75\ t_n$ (with $t_{min}=0.5$ seconds). This results in an exponential increase and decrease in the variable delays when a ramp up or ramp down occur. However, the ramp up is more rapid than the ramp down. It is more important to ramp up quickly, so that the low-on-data condition does not overcome the ramp up procedure. However, when the low-on-data condition is no longer present, a more slow ramp down may be preferable to provide a more smoothly changing variable delay. The ramp down might also just use a linear delay, using the formula $t_{n+1}=t_n-s$ (with $t_{min}=0.5$ seconds), where "s" is a set amount of time that is subtracted from the previous variable delay. For example this set amount of delay reduction might be the same as the standard delay, 0.5 seconds.

The solution is started at step 120. At test 122, the algorithm asks whether the next scan is at a full swath boundary. As stated the controller composes the image into a number of swaths, which are in turn composed of passes. If the answer is no, the delay is set at the standard delay at step 124. If the answer is yes, test 126 asks if a low memory condition exists at controller 58 or if there is a current need for a pen service. If the answer to test 126 is yes, the delay is set to be the variable delay at step 128, and the variable delay is ramped up at step 130.

If the answer to test 126 is no, test 128 asks if the system is recovering from a low memory condition or a pen service. In other words, test 128 asks if the delay is currently anything other than the standard delay. If the answer is yes, at step 130, the delay is set to the variable delay, and at step 132, the variable delay is ramped down. If the answer is no, the delay is set at the standard delay at step 124.

At step 134, if a need for a pen service exists and time is available, a pen service is performed. If a pen service is not needed or if there is not time available, the routine moves on to step 136. At step 136, the method waits either the standard delay or the variable delay (at whatever value the algorithm currently has this value set at) and the current scan is printed. The routine then returns to step 120.

This print mode thus tends to even out the delays between printing of scans by attempting to smoothly ramp up and down the delays between scans arising from low memory conditions or the need for pen servicing.

This algorithm pays particular attention to the boundary between full swaths. As one looks at Table 1, it is clear that once steady state printing is achieved, there is no real difference at the boundaries between full print swaths (for example full print swaths 1 and 2) than there is between any contiguous sets of four print passes, since any set of four print passes will result in a section of the page one full swath height being printed. In other words, there is no real difference between the boundary between a pattern ABCD-BCDA and, for example CDAB-DABC. Therefore, the full swath boundary can be chosen at any of location. Therefore, for any image section, the full swath boundary is set to be the first place where a variable delay is used.

It has been empirically found that choosing a full swath boundary as the place to ramp up or down the delay provides an improvement in print quality, especially when used on transparencies. This advantage may be due to a phenomenon known as re-wetting. Using the standard delay within the passes of an arbitrarily chosen full swath boundary may allow the ink in the scans within those swaths to re-wet the previous scans so that the ink blends more smoothly together within the swath boundary. This may be particularly true on transparencies, because the ink does not absorb as readily into the print medium as it does on paper.

Thus, the present invention provides an advantageous print mode that reduces wait-banding and provides an improved print quality.

We claim:

1. A method of printing with an ink-jet printing system including a scanning ink-jet printhead and a media-advance mechanism, the method comprising:

(a) providing image data representative of an image;

(b) composing said image data into swath data, further composed of a series of scans;

(d) providing a standard delay;

(e) providing a variable delay;

(f) if the next scan is at a full swath boundary, then (1) if a low on swath data condition is found, then increasing said variable delay, (2) if a low on swath data condition is not found, and if the delay is greater than the standard delay, then decreasing said variable delay, and (3) printing said next scan after said variable delay; and (g) repeating step (f) until said image is printed.

2. A method according to claim 1, wherein step (f) further provides that:

if the next scan is not at a full swath boundary, then printing the next scan at said standard delay.

3. A method according to claim 1, further comprising, in step (f), if the next scan is at a full swath boundary, then:

(a) in step (f)(1), if there is either a low on data condition or a need for a pen service, then increasing said variable delay, and if said variable delay is sufficient to perform said pen service, then performing said pen service, and (b) in step (f)(2), if either there is no low on data condition or there is no need for a pen service, and if said variable delay is greater than said standard delay, then decreasing said variable delay.

4. A method according to claim 1, wherein when said variable delay is increased, it is done so exponentially.

5. A method according to claim 1, wherein when said variable delay is decreased, it is done so at a slower rate than the rate at which said variable delay may be increased.

6. A method according to claim 5, wherein when said variable delay is decreased it is done so linearly.

7. A method of printing with an ink-jet printing system including a scanning ink-jet printhead, the method comprising:

(a) providing image data representative of an image;

(b) composing said image data into swath data comprised of a series of swaths, which are further provided in a series of scans;

(c) providing a standard delay;

(d) providing a variable delay;

(e) if the next scan is not at a full swath boundary, then printing said next scan after said standard delay;

(f) if the next scan is at a full swath boundary, then:

(1) if a low on swath data condition is found, then increasing said variable delay, (2) if a low on swath data condition is not found, and if the delay is greater than the standard delay, then decreasing said variable delay, and (3) printing said next scan after said variable delay; and (g) repeating steps (e) and (f) until said image is printed.

8. A method according to claim 7, further comprising, in step (f), if the next scan is at a full swath boundary, then:

(a) in step (f)(1), if there is either a low on data condition or a need for a pen service, then increasing said variable delay, and if said variable delay is sufficient to perform said pen service, then performing said pen service, and (b) in step (f)(2), if either there is no low on data condition or there is no need for a pen service, and if said variable delay is greater than said standard delay, then decreasing said variable delay.

9. A method according to claim 7, wherein when said variable delay is increased, it is done so exponentially.

10. A method according to claim 9, wherein when the rate of decrease of said variable delay is slower than the rate of increase of said variable delay.

11. A method according to claim 10, wherein when said variable delay is decreased, it is done so linearly.

12. A printing system including a scanning ink-jet printhead, the printing system being adapted to print according to image data and being programmed to:

(a) compose said image data into currently available swath data and to provide a series of scans;

(b) provide a standard delay;

(c) provide a variable delay;

(d) test if the next scan is at a full swath boundary, and if so, then (1) if a low on swath data condition is found, increase said variable delay, (2) if a low on swath data condition is not found, and if the delay is greater than the standard delay, decrease said variable delay, and (3) print said next scan after said variable delay; and (e) repeat step (e) until said image is printed.

13. A printing system according to claim 12, wherein in test (d) if the next scan is not at a full swath boundary, said printing system is programmed to print the next scan at said standard delay.

14. A printing system according to claim 12, wherein in test (d), if the next scan is at a full swath boundary, then:

(a) in test (d)(1), if there is either a low on data condition or a need for a pen service, said printing system is programmed:

(1) to increase said variable delay, and (2) if said variable delay is sufficient to perform said pen service, to perform said pen service, and (b) in test (d)(2), if either there is no low on data condition or there is no need for a pen service, said printing system is programmed to decrease said variable delay.

15. A printing system according to claim 12, wherein when said variable delay is decreased, it is done so at a slower rate than the rate at which said variable delay may be increased.

16. A printing system according to claim 15, wherein when said variable delay is increased, it is done so exponentially.

17. A printing system according to claim 16, wherein when said variable delay is decreased it is done so linearly.

* * * * *